United States Patent
Shinohara et al.

(10) Patent No.: US 6,388,712 B1
(45) Date of Patent: May 14, 2002

(54) SYSTEM FOR VERIFYING BROADCAST OF A COMMERCIAL MESSAGE

(75) Inventors: Nobutaka Shinohara; Masuo Wada; Haruhiko Inokuma, all of Yokohama (JP)

(73) Assignees: Kabushiki Kaisha Toshiba, Kawasaki; Video Research Ltd., Tokyo, both of (JP)

(*) Notice: Subject to any disclaimer, the term of this patent is extended or adjusted under 35 U.S.C. 154(b) by 0 days.

(21) Appl. No.: 09/044,229

(22) Filed: Mar. 19, 1998

(30) Foreign Application Priority Data

Oct. 9, 1997 (JP) ............................. 9-277542
Oct. 9, 1997 (JP) ............................. 9-277543

(51) Int. Cl.$^7$ ................................ H04N 7/08
(52) U.S. Cl. ........................................ 348/473; 725/22
(58) Field of Search ................................ 348/473, 465, 348/476, 1, 2, 4; 455/1; 725/22

(56) References Cited

U.S. PATENT DOCUMENTS

| | | | | |
|---|---|---|---|---|
| 4,230,990 A | * | 10/1980 | Lert, Jr. et al. ................ 455/67 |
| 4,368,486 A | * | 1/1983 | DeGoulet et al. ............ 348/478 |
| 4,547,804 A | * | 10/1985 | Greenberg .................... 358/142 |
| 4,805,020 A | * | 2/1989 | Greenberg .................... 358/147 |
| 4,969,041 A | * | 11/1990 | O'Grady et al. ............. 348/478 |
| 4,980,912 A | * | 12/1990 | Welmer ........................ 380/10 |
| 5,200,822 A | * | 4/1993 | Bronfin et al. ............... 358/142 |
| 5,243,423 A | * | 9/1993 | DeJean e tal. ............... 348/473 |
| 5,379,345 A | * | 1/1995 | Greenberg .................... 380/23 |
| 5,737,025 A | * | 4/1998 | Dougherty et al. .......... 348/473 |
| 5,818,935 A | * | 10/1998 | Maa ............................. 380/20 |
| 5,929,920 A | * | 7/1999 | Sizer, II ...................... 348/473 |

FOREIGN PATENT DOCUMENTS

JP 53-11503 2/1978

* cited by examiner

*Primary Examiner*—Victor R. Kostak
(74) *Attorney, Agent, or Firm*—Oblon, Spivak, McClelland, Maier & Neustadt, P.C.

(57) ABSTRACT

A broadcast verification system includes a CM creation device for creating a CM signal to be included in a television signal and a verification device for receiving the television broadcast signal transmitted from a broadcast station and checking the CM signal. The CM creation device includes an encoder for superimposing unique ID information identifying the CM signal to the CM signal at a predetermined position. The verification device includes a decoder for extracting the ID information from the television broadcast signal, a verification section for verifying, on the basis of the extracted ID information and a CM schedule supplied from the broadcast station through a path different from that for the television broadcast signal, whether the CM has been broadcast according to the schedule, and a verification information storage means for storing verification information containing at least the verification result, the broadcasting time of the CM, and the broadcast channel.

5 Claims, 5 Drawing Sheets

| NAME OF INFO. | DIGITS |
|---|---|
| AGENCY | 4 |
| BRANCH OFFICE | 2 |
| SPONSOR | 7 |
| CONTENTS ID | 4 |
| CONTENTS SUB ID | 2 |

SYSTEM FOR VERIFYING BROADCAST OF A COMMERCIAL MESSAGE

BACKGROUND OF THE INVENTION

Field of the Invention

The present invention relates to a broadcast verification system for verifying whether programs and commercial messages are broadcast from broadcast stations according to a predetermined schedule.

This application is based on Japanese Patent Application No. 9-277542, filed Oct. 9, 1997 and Japanese Patent Application No. 9-277543, filed Oct. 9, 1997, the content of which is incorporated herein by reference.

Discussion of the Background

In general, many commercial messages are inserted in programs in television broadcasting, radio broadcasting, cable broadcasting, and the like. Commercial messages are broadcast on the basis of a contract concerning broadcasting times (time slots if broadcasting times cannot be specified as in sports relay broadcasting), contents of the commercial message, and the like, which is made between, for example, a broadcast station and a sponsor through an advertising agency. If a commercial message with predetermined contents is not broadcast at a predetermined time, it means that the broadcast station has broken the contract. A commercial message with predetermined contents may not be broadcast at a predetermined time owing to some mistake in the broadcast station, a fault in a program editing/broadcasting system, or the like. For this reason, the advertising agency, in particular, must check whether the contract is properly fulfilled.

Conventionally, all the received broadcast contents are recorded on a VCR, or the like, and an operator plays the VCR to visually check whether predetermined commercial messages have been broadcast. The sponsor is then notified of the contents checked by the operator. If a predetermined commercial message has not been broadcast according to the contract, the sponsor demands compensation from the broadcast station for the breach of the contract.

According to the above conventional method, the operator must display all the broadcast contents recorded on a VCR or the like on a monitor to visually check them. These operations require great perseverance and concentration. In addition, there is no guarantee that the operator will not overlook something.

There is an automatic commercial message verification system in which a start of the commercial message is detected based on a change of the audio signal and the video signal and an energy distribution pattern of the detected commercial message is compared with plural registered energy distribution patterns.

However, this system cannot accurately discriminate plural commercial messages.

Further, as described in Japanese Patent Disclosure (KOKAI) NO. 53-11503, there is another broadcast verification system using an audio signal. At a transmitter side of this system, a particular frequency band is removed from the audio signal, a digital information signal for indicating the contents of the broadcast program is formed using predetermined frequencies among the removed particular frequency band, and the digital information signal is superposed on the audio signal to be broadcast. At a receiver side, a band pass filter extracts the digital information signal from the broadcast audio signal and it is verified whether a predetermined program is broadcast in accordance with a predetermined schedule based on the extracted digital information signal. This system has an inevitable drawback in which an information of the audio signal is lost and the quality of the sound must be lowered somewhat. In order to minimize the affect of the degradation of sound quality, it is necessary to narrow the removed bandwidth. However, the amount of information to be superposed is accordingly decreased if the removed bandwidth is narrowed.

As described above, according to the conventional method, an operator records all the contents broadcast from broadcast stations, including commercial messages, on a video cassette recorder or the like, and plays back all the recorded broadcast contents to check them. That is, the operator manually performs unimaginative operations. For this reason, problems are posed in terms of work efficiency and reliability.

The conventional automatic commercial message verification system has a drawback in which plural commercial messages cannot be accurately discriminated.

Further, the broadcasting verification system using an audio signal has a drawback in which the sound quality is degraded.

BRIEF SUMMARY OF THE INVENTION

Accordingly, it is an object of the present invention to provide a broadcast verification system which can automatically check whether predetermined contents have been properly broadcast from a broadcast station.

It is another object of the present invention to provide a commercial message verification system which can automatically check whether a predetermined commercial message has been contained in a program broadcast from a broadcast station at a predetermined time.

According to the present invention, there is provided a broadcast verification system comprising a video creation device for creating a video signal to be broadcast from a broadcast station; and a verification device for receiving the broadcast signal broadcast from the broadcast station and verifying whether the video signal created by the video creation device contained in the broadcast signal, wherein the video creation device comprises ID information adding means for adding ID information indicating contents of the video signal to the video signal at a predetermined position, and the verification device comprises ID information extracting means for extracting the ID information from the broadcast signal; and determination means for checking on the basis of the ID information extracted by the ID information extracting means whether the video signal is broadcast according to a predetermined schedule.

According to the broadcast verification system of the present invention, since ID information indicating the contents of a broadcast signal is added to the broadcast signal, the contents of the broadcast signal can be specified on the reception side by extracting the ID information from the vibration signal on the reception side, thereby automatically checking whether predetermined contents have been properly broadcast from the broadcast station.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a broadcast verification system according to the present invention will now be described with reference to the accompanying drawings.

First Embodiment

Figure 1:
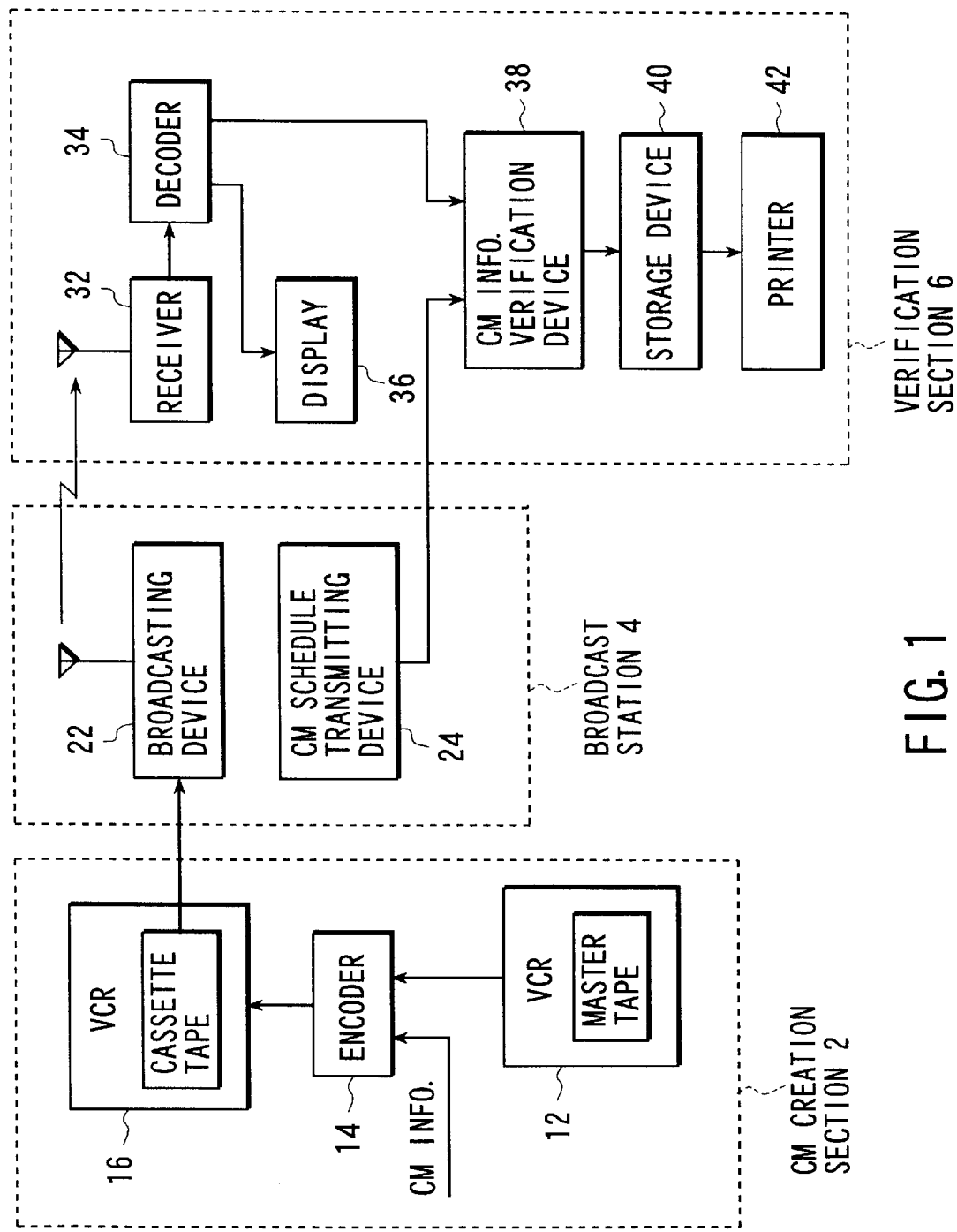
FIG. 1 is a block diagram showing a broadcast verification system according to a first embodiment of the present invention.

FIG. 1 is a block diagram showing the arrangement of the first embodiment. This system mainly comprises a CM creation section 2 for creating a commercial message (to be referred to as a CM hereinafter), a broadcast station 4 for broadcasting a program upon superimposing the CM thereon, and a verification section 6 for verifying whether or not a predetermined CM included in a predetermined program is broadcast from the broadcast station 4.

The CM creation section 2 is placed in an advertising agency to create a CM at the request of a sponsor. The CM creation section 2 comprises a VCR (Video Cassette Recorder) 12 for playing a master tape on which a CM video is recorded, an encoder 14 for superimposing CM information, which is unique to the CM video and represents the contents, on the CM video signal reproduced by the VCR 12, and a VCR 16 for recording the CM video signal output from the encoder 14, on which the CM information is superimposed. The CM information is a characteristic feature of the present invention.

Figures 2, 4:
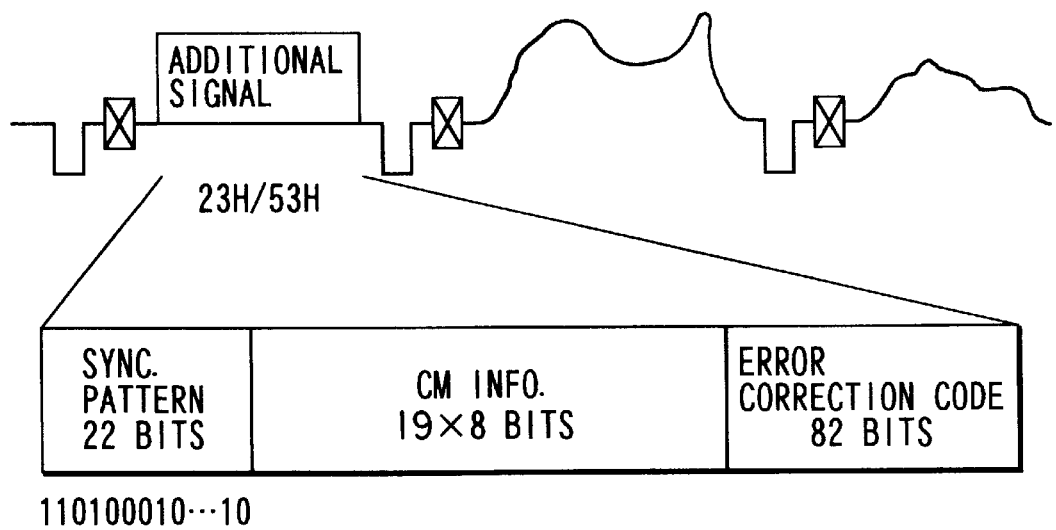
FIG. 2 is a view showing the contents of CM information used in the first embodiment.
FIG. 4 is a view for explaining how CM information is superimposed on a CM video signal by the encoder.

FIG. 2 shows an example of CM information. The CM information has an information amount of 19 digits×8 bits, i.e., an agency name (4 digits), a branch office name (2 digits), a sponsor name (7 digits), contents ID (4 digits), and contents SUB ID (2 digits).

Figure 3:
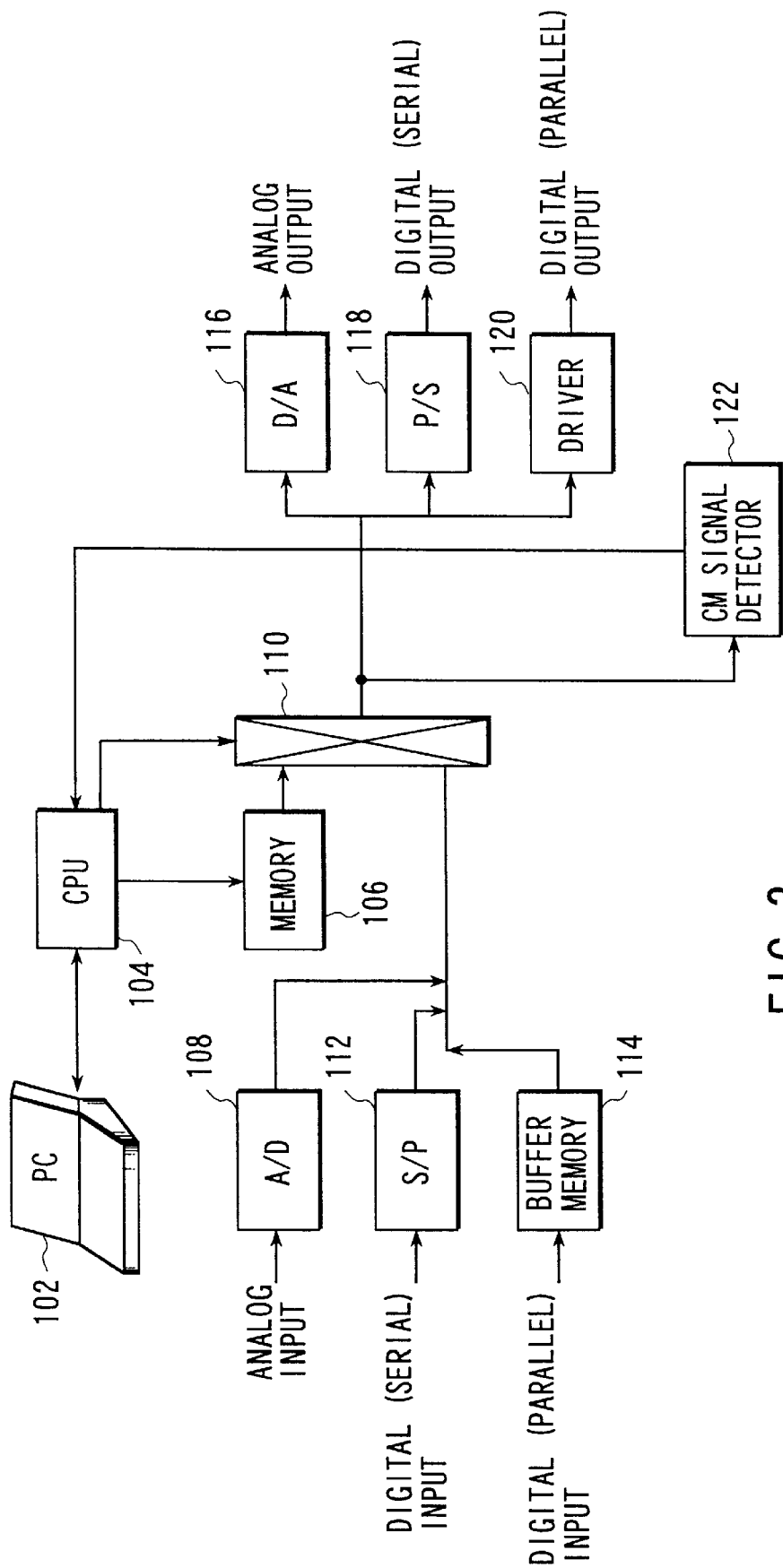
FIG. 3 is a block diagram showing the detailed arrangement of the encoder in the CM creation section in the first embodiment.

FIG. 3 shows an example of the encoder 14 of the CM creation section 2. CM information is created by an CM information creation device 102 constituted by a personal computer and the like, and is sent to a CPU (Central Processing Unit) 104. The CPU 104 stores this CM information in a memory 106. In practice, as shown in FIG. 4, an additional signal having the CM information arranged after a sync pattern (22 bits) indicating the start of the CM information, and an error correction code (82 bits) arranged after the CM information is superimposed on a CM video signal. This overall additional signal is therefore stored in the memory 106.

Note that since CM information must be kept secret from persons other than those associated with this system, the overall additional signal is preferably encrypted (scrambled) when it is superimposed. This is because, if a VCR maker or the like can detect CM information, the CM can be easily skipped in playing back recorded information, resulting in a loss of the effects of the CM.

When the CM video signal is an analog signal, the signal is converted into a digital signal by an A/D (Analog/Digital) converter 108 and input to a selector 110. If this signal is a digital serial signal, the signal is converted into a parallel signal by a S/P (Serial/Parallel) converter 112 and input to the selector 110. If the signal is a digital parallel signal, the signal is input to the selector 110 through a buffer memory 114.

Figure 5A:
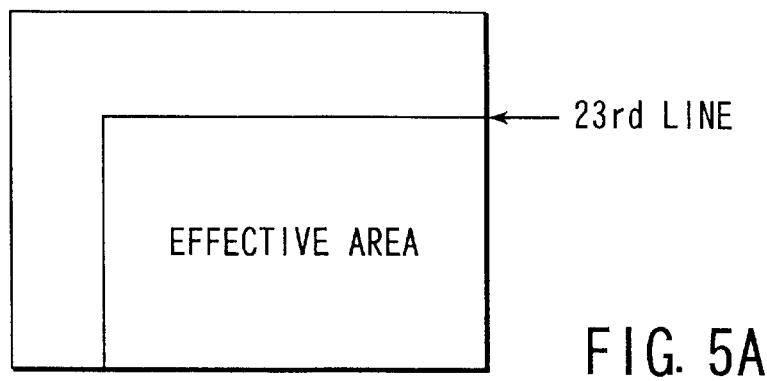
FIGS. 5A and 5B are views each showing the superimposing position of CM information.
Figure 5B:
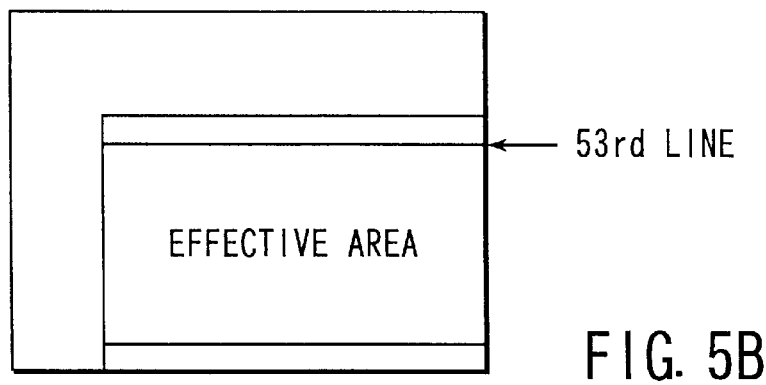

An additional signal is also supplied from the memory 106 to the selector 110. The selector 110 is controlled by the CPU 104 such that it is normally switched to the CM video signal side and is switched to the memory 106 side at a predetermined timing. The predetermined timing is a timing corresponding to a portion which does not infringe the copyright of the CM contents and cannot be edited in the broadcast station. More specifically, this portion corresponds to the start line of an effective area. According to the NTSC scheme, as shown in FIG. 5A, an additional signal is superimposed on the 23rd line. According to the EDTV-2 scheme, as shown in FIG. 5B, an additional signal is superimposed on the 53rd line.

The superposing timing is not limited to the above timings. Usually, the right and left edge (e.g., about 16 dots) of the video frame is not displayed. Therefore, it is possible to superpose the right and left edge of the effective area by about every 10 bits.

The output of the selector 110 is supplied to a D/A converter 116, a P/S converter 118, and a driver 120. This output is also supplied to a CM signal detector 122. The CM signal detector 122 checks whether the additional signal is superposed on the CM video signal, and supplies the determination result to the CPU 104. Thus, the CPU 104 can determine whether the additional signal is correctly superposed on the CM video signal at the predetermined timing. If it is determined that the additional signal is not superposed on the CM video signal at the predetermined timing, the CPU 104 controls the selector 110 so that the additional signal is superposed on the CM video signal of the next frame.

In this manner, the CM video signal on which the additional signal is superimposed is supplied to the VCR 16 through the D/A converter 116, the P/S converter 118, or the driver 120.

Referring back to FIG. 1, the advertising agency hands the tape on which the CM video signal having the additional signal superimposed thereon is recorded by the VCR 16 to the broadcast station 4.

The broadcast station 4 inserts this CM video signal in a program video signal at a predetermined time according to the CM contract, and transmits the signal as a television broadcast signal from a broadcasting device 22. At the same time, CM schedule information indicating the content of the contract (start time, CM video material, and the like) is sent from a CM schedule transmitting device 24 to the verification section 6 on-line or off-line through a medium different from that for the television broadcast signal, e.g., a telephone line or a storage medium such as an FD.

The verification section 6 on the reception side receives the television broadcast signal from the broadcast station 4 through a receiver 32, and outputs the signal to a decoder 34. The decoder 34 decodes (descrambles) the received television broadcast signal, and then detects the sync portion of the additional signal. Upon detecting this sync portion, the decoder 34 performs error correction of the subsequent CM information and error correction code and extracts the CM information. Note that the decoder 34 incorporates a timer, and adds broadcasting time information to the CM information. The decoder 34 supplies the CM information to which the broadcasting time information is added to a CM information verification device 38. The decoder 34 supplies the CM information and the CM video signal to a display 36. The display 36 displays characters indicating the CM information superposed on the CM video on the screen. The CM information characters may be displayed on an entire screen or only at an edge portion. The reason why the CM information characters are displayed is to enable the operator subsidiarily verifies the CM information based on the display.

In order to cope with the variation of the superposing position of the CM information, the decoder 34 sets a window for several lines and reads the start line of the effective area. For the NTSC scheme, a window is set from 20th to 26th lines. For the EDTV-2 scheme, a window is set from 50th to 56th lines. The CM information included in the window is detected by a digital signal processing and supplied to the CM information verification device 38.

The CM information verification device 38 also receives the CM broadcasting schedule supplied from the broadcasting device 22 of the broadcast station 4 through, for example, a telephone line. The CM information verification device 38 verifies whether the CM information extracted by the decoder 34 agrees with the broadcasting schedule supplied from the broadcast station 4. CM verification information having this verification result added to the broadcasting schedule is stored in a storage device 40. Note that the CM verification information includes information such as the broadcasting times, the type of broadcast content, the sponsor name, and the broadcast channel.

This CM broadcast verification information stored in the storage device 40 is printed out as a report to the sponsor by a printer 42 or the CM creation section 2 is notified of the information through a telephone line.

As described above, according to this embodiment, the encoder 14 of the CM creation section 2 adds CM information representing the contents of a CM to a CM video signal at a specific position. The CM video signal on which the CM information is superimposed is handed to the broadcast station 4. Upon receiving the program broadcast from the broadcast station 4, the decoder 34 of the verification section 6 extracts the CM information from the broadcast signal from the broadcast station 4. The CM information verification device 38 then compares this CM information with the broadcasting schedule containing the CM information supplied through a transmission line different from that for the broadcast wave. It is verified automatically and reliably whether the CM broadcast transmitted by the broadcast wave is in accordance with the contract. Since the CM information is superimposed on a portion outside the effective area of the CM video, this processing has no influence on the contents of the CM.

The CM verification information containing this verification result and information indicating the CM broadcasting times and the broadcast channel is stored in the storage device 40. The broadcast state of a CM broadcast can therefore be automatically verified and managed, without any manual operation, on the basis of the verification information stored in the storage device 40. It can also be checked whether the broadcast station 4 broadcasts a contracted CM video at a contracted time.

Since the CM information is superimposed on an end portion of the effective area of the CM video signal by the encoder 14 of the CM creation section 2, the CM information cannot be deleted on the broadcast station 4 side.

In this embodiment, it is assumed that CM information is superimposed on the start portion of a CM video signal (normally 15 sec), i.e, the first frame. However, this superimposing frame may be made variable to be randomly set. This makes CM information harder to detect to prevent a third party from abusing this information.

It is preferably checked on the CM creation section 2 side whether CM information is surely superimposed. For this purpose, a CM information detector is connected to the output terminal of the selector 110 in the encoder 14. If the CM information cannot be detected at a proper superimposing position, the CM information is also superimposed on the next frame.

A single sponsor often requests many broadcast stations to perform CM broadcasting. For this reason, verification sections 6 may be arranged nationwide, and pieces of verification information obtained in the respective local areas may be sent to the CM creation section 2 through telephone lines to be collected. With this arrangement, a broadcast verification system capable of performing broadcast verification in the respective local areas can be realized.

Another embodiment of the present invention will be described next. The same reference numerals in the following embodiment denote the same parts as in the first embodiment, and a detailed description thereof will be omitted.

Second Embodiment

The second embodiment exemplifies a case in which CM information is superimposed on an audio signal. This includes television broadcasting (CM information is superimposed on a CM audio signal) as well as radio broadcasting. A system of the second embodiment mainly comprises a CM creating section 6, a broadcast section 7, and a verification section 8 as in the first embodiment.

The CM creating section 6 comprises a tape recorder 62 for playing a master tape on which a CM audio signal is recorded, a multi-band eject filter (to be referred to as a BEF hereinafter) 64 for superimposing CM information unique to a CM, which is a characteristic feature of the present invention, a CM information pattern generator 66 for determining a CM information pattern, as an eject band pattern, which corresponds to a CM ID unique to the CM, and a tape recorder 68 for recording the CM audio signal having the CM information superimposed thereon and output from the BEF 64.

Assume that CM information has an information amount of 19 digits×8 bits as in the first embodiment.

Figure 7:
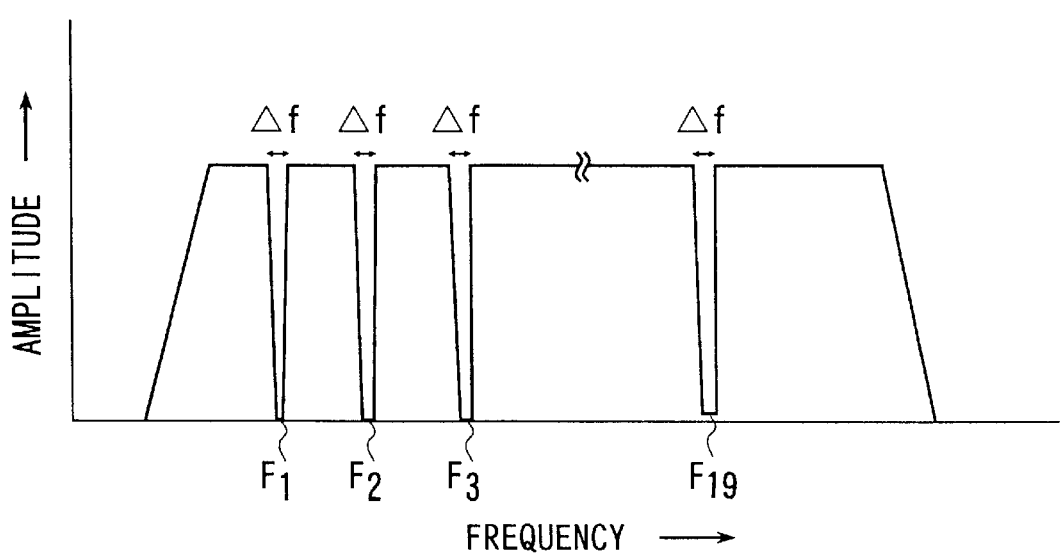
FIG. 7 is a graph for explaining how CM information is superimposed on an audio signal by a multi-band eject filter in the second embodiment of the present invention.
Figure 6:
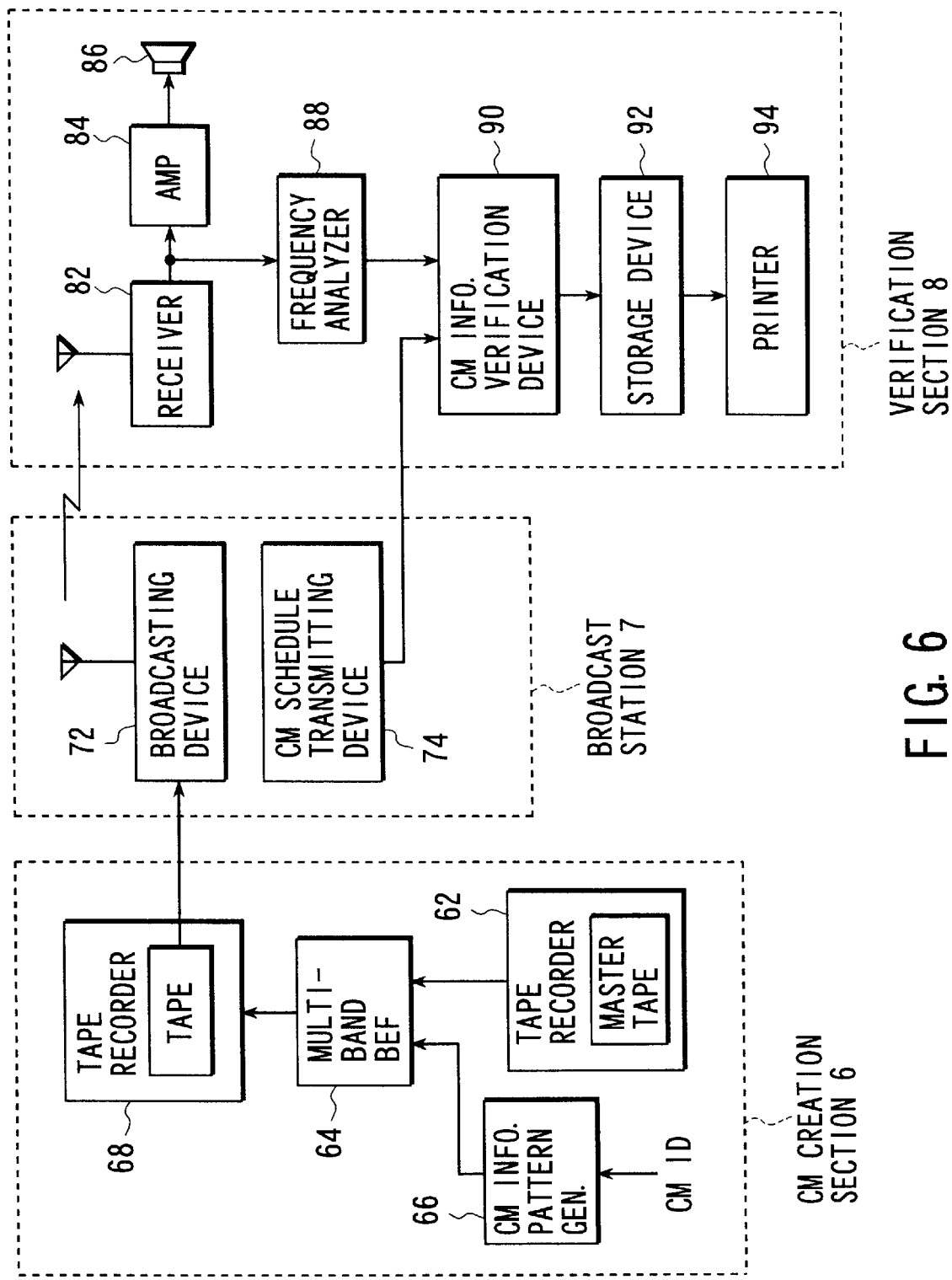
FIG. 6 is a block diagram showing a broadcast verification system according to a second embodiment of the present invention.

FIG. 7 shows the function of the BEF 64. Predetermined eject center frequencies $F_1$, $F_2$ to $F_{19}$ are set in advance. CM information is superimposed on an audio signal as a 24 bit code by ejecting or not ejecting bands $\Delta f$ respectively having these center frequencies. Since only an information amount of 19 digits×1 bit can be superimposed at a time, all the CM information can be superimposed by superimposing such unit information eight times. Obviously, bands $\Delta f$ to be ejected and the intervals of center frequencies $F_1$, $F_2$ to $F_{24}$ correspond to the sound volume and quality that have no influences on the hearing of a person even if they are ejected.

The advertising agency delivers the tape on which the CM audio signal having the CM information superimposed thereon is recorded by the tape recorder 68 to the broadcast section 7.

The broadcast section 7 inserts this CM audio signal in a program audio signal at a predetermined time according to the contract, and transmits the resultant signal as a radio broadcast signal from a broadcasting device 72. At the same time, CM schedule information indicating the content of the contract (start time, CM sound material, and the like) is sent from a CM schedule transmitting device 74 to the verification section 8 on-line or off-line through a medium different from that for a radio broadcast signal, e.g., a telephone line or a storage medium such as an FD.

The verification section 8 on the reception side receives the radio broadcast signal from the broadcast section 7 through a receiver 82. The verification section 8 outputs the signal to a loudspeaker 86 through an amplifier 84 and also outputs it to a frequency analyzer 88. The frequency analyzer 88 detects whether or not the frequencies $F_1$, $F_2$ to $F_{24}$ are ejected by performing frequency analysis processing for the received audio broadcast signal. The frequency analyzer 88 outputs this detection result denoting the CM information to a CM information verification device 90. Note that the frequency analyzer 88 incorporates a timer to add broadcasting time information to the detection result.

The CM information verification device 90 receives the CM broadcasting schedule, supplied from the vibration schedule transmitting device 74 of the broadcast section 7, through a telephone line or the like. The CM information verification device 90 decodes the CM information from a combination of ejected frequencies extracted by the frequency analyzer 88, and verifies whether the CM information agrees with the broadcasting schedule supplied from the broadcast section 7. CM verification information having this verification result added to the broadcasting schedule is stored in a storage device 92. Note that the CM verification information contains information such as broadcasting times, the type of broadcast content, the sponsor name, and the broadcast channel.

The CM broadcast verification information stored in the storage device 92 is printed out as a report to the sponsor by a printer 94 or the CM creating section 6 is notified of the information through a telephone line, as needed.

As described above, according to this embodiment, the BEF 64 of the CM creating section 6 superimposes CM information indicating the contents of a CM on a CM audio signal so as not to influence the hearing of a person. This CM audio signal on which the CM information is superimposed is handed to the broadcast section 7. Upon receiving the program broadcast from the broadcast section 7, the frequency analyzer 88 of the verification section 8 extracts the CM information from the broadcast signal from the broadcast section 7. The CM information verification device 90 then compares this CM information with the broadcasting schedule containing the CM information supplied through a transmission line different from that for the broadcast wave. It is verified automatically and reliably whether the CM broadcast transmitted by the broadcast wave is in accordance with the contract. Since the CM information is not directly superposed but is coded and superposed as a combination of ejection or not of predetermined frequencies, it is possible to superpose a large amount of information without degrading the sound quality.

The CM verification information containing this verification result and the information indicating the CM broadcasting time and the broadcast channel is stored in the storage device 92. The broadcast state of a CM broadcast can therefore be automatically verified and managed, without any manual operation, on the basis of the verification information stored in the storage device 92. It can also be checked whether the broadcast station 4 has broadcast a contracted CM broadcast at a contracted time.

As described above, according to the present invention, a broadcast signal is transmitted from a broadcast station after an ID signal for identifying the broadcast signal is superimposed thereon. When this broadcast signal is received, the ID signal is extracted from the received signal. This system can therefore automatically and accurately verify, without requiring any operator, on the basis of the extracted ID signal whether predetermined contents are broadcast.

The present invention is not limited to the above embodiments, and various modifications can be made. For example, the above description is based on the assumption that broadcasting is performed by means of radio waves. However, the present invention can also be applied to cable broadcasting and internet broadcasting. In addition, the above description is based on the assumption that the verification device is placed on the reception side. However, the present invention can be applied to a system in which a verification device is placed in a broadcast station to allow the broadcast station to perform verification. In this case as well, since a transmitter failure and the like may occur, each signal transmitted from an antenna is preferably received and verified. When a verification device is to be used in a broadcast station, the contents to be verified are not limited to a CM, and a program itself may be verified. For example, this device may be used to verify a program transmitted from a key station to a local station. Further, at present, a satellite relay station is installed in a bad reception area, and monitor persons are designated to check the operation of the station. This broadcast verification system may be used instead of persons.

What is claimed is:

1. A broadcast verification system comprising:
    an audio signal creation device for creating an audio signal to be broadcast from a broadcast station; and
    a verification device for receiving the broadcast signal broadcast from the broadcast station, and verifying whether the audio signal is contained in the broadcast signal,
    wherein said audio signal creation device comprises ID information adding means for adding ID information indicating contents of the audio signal to the audio signal by selectively ejecting/not ejecting a plurality of predetermined frequency components of the audio signal, and
    said verification device comprises:
        ID information extracting means for extracting the ID information from the broadcast signal depending on whether the plurality of predetermined frequency components are ejected/not ejected from the broadcast signal; and
        determination means for checking on the basis of the ID information extracted by said ID information extracting means whether the audio signal is broadcast according to a predetermined schedule.

2. A system according to claim 1, wherein said ID information adding means adds a plurality of pieces of ID information to the audio signal by selectively ejecting/not ejecting a plurality of predetermined frequency components at a plurality of timings.

3. An audio signal creation device for a broadcast verification system, the audio signal creation device comprising:

means for creating an audio signal to be broadcast from a broadcast station; and ID information adding means for adding ID information indicating contents of the audio signal to the audio signal by selectively ejecting/not ejecting a plurality of predetermined frequency components of the audio signal.

4. A device according to claim 3, wherein said ID information adding means adds a plurality of pieces of ID information to the audio signal by selectively ejecting/not ejecting a plurality of predetermined frequency components at a plurality of timings.

5. A broadcast verification device comprising:

means for receiving an audio signal broadcast from the broadcast station, the audio signal including an ID information indicating contents of the audio signal by selectively ejecting/not ejecting a plurality of predetermined frequency components of the audio signal;

ID information extracting means for extracting the ID information from the broadcast signal depending on whether the plurality of predetermined frequency components are ejected/not ejected from the broadcast signal; and determination means for checking on the basis of the ID information extracted by said ID information extracting means whether the audio signal is broadcast according to a predetermined schedule.

* * * * *

UNITED STATES PATENT AND TRADEMARK OFFICE
CERTIFICATE OF CORRECTION

PATENT NO.   : 6,388,712 B1
DATED        : May 14, 2002
INVENTOR(S)  : Wada et al.

It is certified that error appears in the above-identified patent and that said Letters Patent is hereby corrected as shown below:

<u>Title page,</u>
Item [12], should read: -- [12] United States Patent
  Wada et al. --
Item [75], the Inventors should read:
-- [75] Inventors: Masuo Wada; Haruhiko Inokuma,
  both of Yokohama (JP) --

Signed and Sealed this

Twenty-second Day of October, 2002

*Attest:*

*Attesting Officer*

JAMES E. ROGAN
*Director of the United States Patent and Trademark Office*